United States Patent Office 3,119,803
Patented Jan. 28, 1964

3,119,803
POLYMERIZATION OF ETHYLENE WITH A
DECANOYL PEROXIDE CATALYST
Sylvester P. Horkowitz, Tokyo, Japan, assignor to Spencer Chemical Company, Kansas City, Mo., a corporation of Missouri
No Drawing. Filed May 22, 1961, Ser. No. 111,440
8 Claims. (Cl. 260—94.9)

This invention relates to processes of polymerizing ethylene. More particularly, it relates to polymerization of ethylene employing a diacyl peroxide of an aliphatic carboxylic acid.

Heretofore, certain peroxides of aliphatic carboxylic acids have been employed commercially as catalysts or free radical initiators, in providing normally solid polymers of ethylene. For this use, they have been found to be convenient and economical and to provide efficient and controlled means by which to bring about the polymerization. In view of the fact that the aliphatic carboxylic acids, or fatty acids, having an even number of carbon atoms are "naturally-occurring," the peroxides of these carboxylic acids as a practical matter have received the greatest attention. Accordingly, the peroxides of the even numbered carboxylic acids having eight and twelve carbon atoms, respectively, have been available in commercial amounts and have been used to polymerize ethylene to provide marketable ethylene polymers. The diacyl peroxide of the carboxylic acid having twelve carbon atoms (lauroyl peroxide) has received the larger acceptance in view of the fact that it is a solid at ambient room conditions thereby affording greater ease and safety in handling, storing, and shipping.

Although the diacyl peroxides of the even numbered aliphatic carboxylic acids as above mentioned have been used extensively in the providing of ethylene polymers, there has been repeated objection by consumers concerning these polymers that they have excessive odors. The odor of the diacyl peroxide derived from the carboxylic acid having eight carbon atoms (caprylyl peroxide) is comparatively intense and noxious to those consumers of the fabricating art in view of the fact that it imparts to the freshly prepared or heated polymer a repugnant goat-like odor. Likewise, but in a lesser manner, but yet ordinarily in highly objectionable degree, lauroyl peroxide imparts to the end polymer an undesired pronounced odor although of a less noxious scent. This objectionable odor, which is easily discerned especially on heating, has been variously described but in general has been denominated as "fruity" or "lemony" and fatty in character and being somewhat sharp or penetrating.

An object of this invention is to provide improved polymers of ethylene. A further object of this invention is to provide improved processes for providing polymers of ethylene. Another object of this invention is to provide efficient and controllable processes by which essentially odorless polymers of ethylene can be obtained. Other objects of this invention will be apparent to those skilled in the art from the herein provided disclosure.

By the processes of this invention, it has surprisingly been found that essentially odorless polymers of ethylene can be obtained by the polymerization of ethylene employing a particular diacyl peroxide. The processes of this invention are comprised of polymerizing ethylene to provide a normally solid, essentially odorless polyethylene, which comprises subjecting ethylene to a free radical initiating quantity of decanoyl peroxide under polymerizing conditions, including a super-atmospheric pressure at elevated polymerization temperatures, and recovering the produced polymers of ethylene.

The finding that the polymers of ethylene provided by the diacyl peroxide of decanoic acid are markedly improved as to odor and other properties is surprising in view of the fact that the previously preferred aliphatic diacyl peroxide, lauroyl peroxide, and decanoyl peroxide employed in the herein provided inventive processes themselves are essentially indistinguishable as to odor. Additionally, this advantage is unexpected in view of the fact that generally those skilled in the chemical art would suggest if anything that the polymers derived from the higher peroxide lauroyl peroxide would have lesser odor than those polymers derived from the lower diacyl peroxide employed in this invention, decanoyl peroxide, the basis of this suggestion being that in general the higher the molecular weight in the homologous series of aliphatic carboxylic acids, the lesser the intenseness of the odors of the acids.

The processes of this invention can be carried on in a batch or a continuous manner. Preferably, for the economy required in commercial production of the polymers of ethylene, the continuous procedure will be preferred, such as provided by use of autoclave or tubular reactors. The equipment used in these processes can be that found useful in the polymerization of ethylene by the use of the processes in which lauroyl peroxide was the free radical initiator.

The polymerization conditions functional in the herein provided processes are essentially like those found useful in the polymerization of ethylene by lauroyl peroxide. For example, any polymerization pressure can be employed which the equipment at hand will accommodate and which will provide the desired characteristics in the end polymers. Normally the pressure will be about 10,000 to about 40,000 p.s.i. (pounds per square inch). Preferably, under most conditions, a polymerization pressure of about 12,000 to about 25,000 p.s.i. will be employed. A polymerization temperature upwards of about 200° F. will usually be employed. An upper polymerization temperature is governed by the decomposition point of ethylene. Therefore, customarily a polymerization temperature not in excess of about 550° F. will be used. A presently preferred temperature range is about 250° to about 500° F.

With particular reference to the continuous procedure, a stream of ethylene, along with any other monomers if desired, is continuously introduced into the reaction chamber along with a continuous introduction of decanoyl peroxide. For convenience in the introduction of the peroxide, peroxide is dissolved in a carrier which is preferably inert and essentially odorless itself and which is capable of providing reasonably concentrated solutions of the initiator at temperatures preferably less than about 100° F. At these lower temperatures it is not only more convenient to handle the catalyst composition but generally considerably less decomposition of the catalyst arises in the catalyst reservoir prior to its introduction and utilization in the polymerization chamber. Thus, undue waste of the costly catalyst ingredient is avoided.

As the catalyst carrier, it has been found preferable to employ aliphtaic liquid hydrocarbons which remain liquids under the pressurized conditions at which the catalyst is pumped into the reaction chamber. Suitable aliphatic hydrocarbon solvents are those saturated hydrocarbons which have from about six to about twenty carbon atoms, preferably about eight to fourteen carbon atoms. A particularly suitable carrier has been found to be a hydrocarbon having from about eight to about fourteen carbon atoms since decanoyl peroxide has high solubility therein at relatively low temperatures, for example at temperatures of from about 70° to 100° F. Yet, these hydrocarbon solvent catalyst compositions have adequate viscosity to permit pumping into the reaction chamber employing a variety of pumping mechanisms commercially employed for such purpose. However, on the other hand, the hydrocarbon is preferably one having a relatively high vapor pressure, thereby favoring ready volatilization of any residual carrier from the end polymer product. A significant virtue of the processes of this invention is that dangerous aromatic solvents such as benzene can be avoided with convenience as distinguished from the prior art processes employing lauroyl peroxide.

The quantity of catalyst introduced as with other catalysts or free radical initiators is in part dependent upon the required temperature in the reactor in order to bring about the desired polymerization. The quantity of the decanoyl peroxide introduced under corresponding polymerization conditions will be within the broad range of that required when lauroyl peroxide is employed, although it is presently believed that a lesser quantity will generally be required of the decanoyl peroxide. A quantity of the decanoyl peroxide in the range of about one to ten pounds per thousand pounds of polymer produced will be ordinarily adequate in production of most ethylene polymers. The concentration of the decanoyl peroxide in the carrier customarily will be at least about ten percent by weight. A small quantity of another free radical initiator can be used if desired concurrently with decanoyl peroxide in order to provide a wider range of polymerization temperatures.

In the continuous processes the produced polymers of course will be removed from the reaction chamber as produced and the unpolymerized monomer will be removed from the molten polymer by the use of appropriate separating chambers. Following common practice, the molten polymer will be generally introduced into a water bath to form a continuous ribbon, which will be cubed into convenient sizes for storage and utilization.

Other polymer additives which are conventional for addition to polyethylene, such as antioxidants, ultraviolet light stabilizers, fillers, coloring agents, and the like can be added as desired. The additives will be thoroughly mixed with the polymer employing conventional mixing equipment such as Banbury mixers, compounding extruders, and the like. Although this invention has been principally described with reference to homo-ethylene polymers, whenever within the spirit of this invention it is applicable to production of hetero-ethylene polymers such as for example those ethylene copolymers provided when an amount of an alkyl acrylate, illustratively methyl acrylate, is a part of the monomer feed. Such departures it is to be understood are within the scope of this invention.

A convenient and simple method for comparative evaluation of the finally produced polymer is set forth hereinafter in Example 1.

The following examples are in further illustration of the compounds and processes of this invention but are not in limitation thereof except as defined by the appended claims.

*Example 1*

A polyethylene is produced by introducing a stream of ethylene into a commercial-sized autoclave reactor having an inside diameter of about one foot at a rate of about 2,000 pounds per hour. The temperatures within the reaction zone of the autoclave reactor range from about 325° to about 500° F., being controlled by catalyst addition at the 325° F. range. The catalyst composition employed consists of lauroyl peroxide in a saturated aliphatic hydrocarbon solvent in which the hydrocarbon molecules have on the average about ten carbon atoms and a low aromatic content. The concentration of the peroxide in the carrier is about 12.9 percent by weight. The catalyst composition supply is maintained at about 120° F. to maintain a solution. The catalyst is introduced near the top of the reaction at the rate of about two pounds per thousand pounds of produced polymer. A small quantity of an additional catalyst (0.085 pound per thousand pounds of polyethylene produced) is also introduced through a second port in an upper part of the reactor to extend somewhat the lower effective polymerization temperature limit. Polyethylene is produced at a rate of about two thousand pounds per hour. The contents of the reactor are agitated during the polymerization. An average pressure of about 18,100 is employed.

Polyethylene is removed from the reactor at the above mentioned rate, is separated from the unconsumed ethylene, is cooled in a water bath, and is severed into small cubes. The polyethylene produced has a melt index of about 2.5 and a density of about 0.921.

Standard sized glass bottles having aluminum lined screw caps are filled half full of the polymer product and the caps are replaced in tightened position. The half-filled bottles are placed in an oven controlled at about 70° F. overnight. On removing the caps after the overnight heating, readily discerned is a coconut-like odor which is strong and highly objectionable to those skilled in testing acceptability of the end product for distribution to the trade.

*Example 2*

Repeating the procedure of Example 1 with the exception that decanoyl peroxide is employed instead of the lauroyl peroxide, a solid polyethylene is obtained having about a 2.5 melt index and a density of about 0.921. The polymer product is evaluated for odor by the test described in Example 1 above. After the overnight exposure to the 70° F. temperature, comparatively no odor can be noted in surprising contrast to the test result of the analogous polymer provided by initiation with lauroyl peroxide under Example 1.

What is claimed is:

1. A process of polymerizing ethylene to provide a normally solid, essentially odorless polymer which comprises exposing ethylene to an initiating quantity of decanoyl peroxide under polymerizing conditions, including super-atmospheric pressure and a polymerization temperature upwards of 200° F., and recovering said polyethylene.

2. A process of claim 1 wherein the polymerization temperature is in the range of about 250° to about 500° F.

3. A process of claim 1 wherein the pressure employed in the process is in the range of about 2,000 to about 25,000 p.s.i.

4. A process of claim 1 wherein the polymerization temperature employed is in the range of about 250° to about 500° F. and the polymerization pressure is in the range of about 12,000 to about 25,000 p.s.i.

5. A process of claim 1 wherein the decanoyl peroxide carrier is an aliphatic hydrocarbon solvent.

6. A process of claim 1 wherein the decanoyl peroxide carrier is an aliphatic hydrocarbon solvent having an average molecular weight in which the carbon atom number is about six to about twenty carbon atoms.

7. A process of claim 1 wherein the decanoyl peroxide carrier is an aliphatic hydrocarbon solvent having an average molecular weight in which the carbon atom number is about eight to about fourteen carbon atoms, said hydrocarbon solvent having a low aromatic content.

8. A process of claim 1 wherein the polymerization temperature is in the range of about 250° to about 500° F., the pressure employed is about 12,000 to about 25,000 p.s.i., and the catalyst carrier is an aliphatic hydrocarbon solvent having an average molecular weight in which the carbon atom number is about eight to about fourteen carbon atoms, and the said hydrocarbon solvent has a low aromatic content.

References Cited in the file of this patent

UNITED STATES PATENTS 2,754,278     Wilson et al. _____ July 10, 1956

OTHER REFERENCES

Silbert et al.: 81 J.A.C.S. 2364–2367, May 20, 1959.